(12) United States Patent
Irons et al.

(10) Patent No.: US 10,110,771 B2
(45) Date of Patent: Oct. 23, 2018

(54) MANAGING PRINTED DOCUMENTS IN A DOCUMENT PROCESSING SYSTEM

(71) Applicant: DocSolid LLC, Phoenix, AZ (US)

(72) Inventors: Steven W. Irons, Phoenix, AZ (US); David R. Guilbault, Scottsdale, AZ (US); Eric R. Lynn, Phoenix, AZ (US); Simon Okunev, Millburn, NJ (US); Ian M. Miller, Summit, NJ (US)

(73) Assignee: DocSolid LLC, Phoenix, AZ (US)

( * ) Notice: Subject to any disclaimer, the term of this patent is extended or adjusted under 35 U.S.C. 154(b) by 0 days.

(21) Appl. No.: 14/733,223

(22) Filed: Jun. 8, 2015

(65) Prior Publication Data

US 2016/0360062 A1 Dec. 8, 2016

(51) Int. Cl.
*H04N 1/32* (2006.01)
*G06F 3/12* (2006.01)
*G06Q 10/08* (2012.01)

(52) U.S. Cl.
CPC ....... *H04N 1/32144* (2013.01); *G06F 3/1204* (2013.01); *G06F 3/1242* (2013.01); *G06F 3/1285* (2013.01); *G06Q 10/08* (2013.01)

(58) Field of Classification Search
None
See application file for complete search history.

(56) References Cited

U.S. PATENT DOCUMENTS

| | | |
|---|---|---|
| 6,192,165 B1 | 2/2001 | Irons et al. |
| 6,427,032 B1 | 6/2002 | Irons et al. |
| 6,674,924 B2 | 1/2004 | Wright et al. |
| 6,744,936 B2 | 6/2004 | Irons et al. |
| 6,952,281 B1 | 10/2005 | Irons et al. |
| 7,182,259 B2 | 2/2007 | Lubow et al. |
| 7,606,831 B2 | 10/2009 | Quinn et al. |
| 7,733,522 B2 | 6/2010 | Irons et al. |
| 7,798,417 B2 | 9/2010 | Snyder et al. |
| 7,942,328 B2 | 5/2011 | Snyder et al. |
| 8,194,272 B2 | 6/2012 | Yoshizumi et al. |
| 8,194,274 B2 | 6/2012 | Babbrah et al. |
| 8,375,324 B1 | 2/2013 | Zubizarreta et al. |
| 8,787,616 B2 | 6/2014 | Irons et al. |
| 9,025,213 B1 | 5/2015 | Irons et al. |
| 9,323,784 B2 | 4/2016 | King et al. |

(Continued)

*Primary Examiner* — John R Wallace
(74) *Attorney, Agent, or Firm* — Martin & Associates, LLC; Derek P. Martin

(57) ABSTRACT

A printed document manager manages printed documents associated with respective electronic documents. When a document is printed, a graphical symbol referred to as a "postmark" is generated and inserted into the print stream so the postmark is printed on the hard copy of the document. The printed document is logged in a printed document store along with metadata associated with the printed document. The postmark on the printed document can be used for one or more purposes, such as to determine whether the printed document is current, to locate the corresponding print image in the printed document store, to locate the corresponding electronic document in the document management system, to automatically file a hand-notated version of the printed document, and to determine whether the printed document can be shredded after use. The printed document manager thus provides a way to effectively manage printed documents.

20 Claims, 11 Drawing Sheets

(56) References Cited

U.S. PATENT DOCUMENTS

| | | | |
|---|---|---|---|
| 9,355,263 B2 | 5/2016 | Irons et al. | |
| 9,378,205 B1 | 6/2016 | Schmidt | |
| 2001/0039625 A1* | 11/2001 | Ananda | G06F 21/125 |
| | | | 726/26 |
| 2002/0111960 A1 | 8/2002 | Irons et al. | |
| 2003/0115162 A1 | 6/2003 | Konik | |
| 2006/0184522 A1 | 8/2006 | McFarland et al. | |
| 2008/0163364 A1 | 7/2008 | Ferlitsch | |
| 2008/0239328 A1 | 10/2008 | Mariotti et al. | |
| 2009/0037444 A1 | 2/2009 | Stapleton | |
| 2009/0070348 A1 | 3/2009 | Uejo | |
| 2010/0033754 A1 | 2/2010 | Okita | |
| 2010/0097661 A1* | 4/2010 | Hoblit | H04N 1/32133 |
| | | | 358/405 |
| 2010/0237993 A1* | 9/2010 | Ohsawa | H04N 1/32101 |
| | | | 340/5.86 |
| 2011/0001989 A1 | 1/2011 | Pesar | |
| 2011/0032547 A1 | 2/2011 | Saito | |
| 2014/0019843 A1* | 1/2014 | Schmidt | G06F 17/241 |
| | | | 715/230 |
| 2014/0159874 A1* | 6/2014 | Hull | G06F 17/30876 |
| | | | 340/10.5 |
| 2015/0186654 A1 | 7/2015 | Albrecht | |
| 2015/0235034 A1 | 8/2015 | Irons et al. | |

\* cited by examiner

| Date/Time | Machine |
|---|---|
| YYYDDDHHMMSS | EFGH |

| XML File | |
|---|---|
| Postmark Data | |
| PCN | |
| Doc Name | |
| User Name | |
| Printing App | |
| Printer | |
| # Copies | |
| Page Count | |
| Date | |
| Time | |
| MAC Address | |

MANAGING PRINTED DOCUMENTS IN A DOCUMENT PROCESSING SYSTEM

BACKGROUND

1. Technical Field

This disclosure generally relates to processing of documents, and more specifically relates to managing printed documents in a document processing system.

2. Background Art

Computer systems have vastly improved the efficiency of many modern workers by providing ways to quickly and efficiently generate and handle electronic documents. Many software tools have been developed that generate and/or process electronic documents in various ways, including word processors, spreadsheets, databases, scanning software, web page development systems, content management systems, hypertext markup language (HTML), extensible markup language (XML), etc. It has long been the goal of many people in the information processing field to realize a "paperless office", which means an office where physical paper documents are completely replaced with electronic documents. However, the dream of achieving a paperless office has not been achieved in most business contexts.

One major problem to achieving a paperless office is the preference of many people to work with hard printed copies of documents. Even with a document management system and procedures in place that convert all incoming paper documents to electronic form, people often will print hard copies to take to meetings, to take hand-written notes on, because they prefer to read from paper, or because they prefer to file in paper form. There is currently no known way to effectively identify, track, manage or confidently shred documents that have been printed from a document management system.

BRIEF SUMMARY

A printed document manager manages printed documents associated with respective electronic documents. When a document is printed, a graphical symbol referred to as a "postmark" is generated and inserted into the print stream so the postmark is printed on the hard copy of the document. The printed document is logged in a printed document store along with metadata associated with the printed document. The postmark on the printed document can be used for one or more purposes, such as to determine whether the printed document is current, to locate the corresponding print image in the printed document store, to locate the corresponding electronic document in the document management system, to automatically file a hand-notated version of the printed document, and to determine whether the printed document can be shredded after use. The printed document manager thus provides a way to effectively manage printed documents.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a printed document manager that manages printed documents associated with respective electronic documents. When a document is printed, a graphical symbol referred to as a "postmark" is generated and inserted into the print stream so the postmark is printed on the hard copy of the document. The printed document is logged in a printed document store along with metadata associated with the printed document. The postmark on the printed document can be used for one or more purposes, such as to determine whether the printed document is current, to locate the corresponding print image in the printed document store, to locate the corresponding electronic document in the document management system, to automatically file a hand-notated version of the printed document, and to determine whether the printed document can be shredded after use. The printed document manager thus provides a way to effectively manage printed documents.

Figure 1:
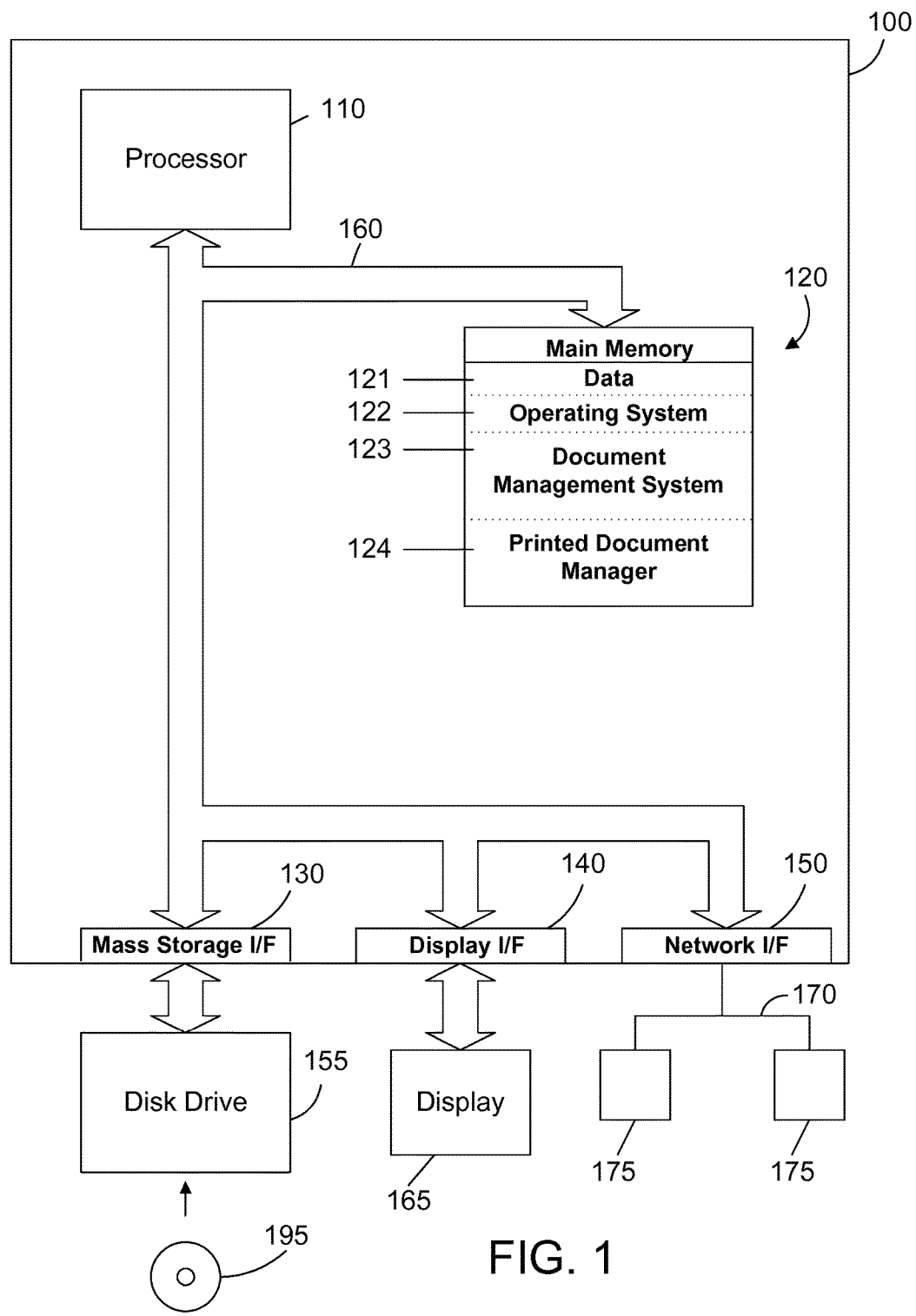
FIG. 1 is a block diagram of a computer system that includes a printed document manager that manages printed documents.

Referring to FIG. 1, computer system 100 is one suitable implementation of a computer system that could implement the printed document manager disclosed and claimed herein. Computer system 100 could be any suitable computer system, such as an IBM POWER computer system. However, those skilled in the art will appreciate that the disclosure herein applies equally to any computer system, regardless of whether the computer system is a complicated multi-user computing apparatus, a single user workstation, an embedded control system, or a mobile device such as a smart phone, tablet computer, laptop computer, etc. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a disk drive 155, to computer system 100. One specific type of disk drive 155 is a readable and writable CD-RW drive, which may store data to and read data from a CD-RW 195. CD-RW 195 is one suitable example of non-transitory computer readable media.

Main memory 120 preferably contains data 121, an operating system 122, a document management system 123, and a printed document manager 124. The printed document manager 124 could be part of the document management system 123, or could be separate from the document management system 123. A document processing system could include both the document management system 123 and the printed document manager 124. The printed document manager 124 generates postmarks for printed documents and stores those printed documents in a printed document store. Details regarding possible functions of the printed document manager 124 are given below.

Computer system 100 can utilize well known virtual addressing mechanisms that allow the programs of computer system 100 to behave as if they only have access to a large, single storage entity instead of access to multiple, smaller storage entities such as main memory 120 and disk drive 155. Therefore, while data 121, operating system 122, document management system 123 and printed document manager 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100. In addition, computer system 100 could include one or more virtual machines, with the document processing system 140 running on one of the virtual machines.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a printed document manager as disclosed and claimed herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems or other network devices 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within network interface 150.

As will be appreciated by one skilled in the art, aspects of the disclosed printed document manager may be embodied as a system, method or computer program product. Accordingly, aspects of the printed document manager may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the document processing system may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the document processing system may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the printed document manager are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the prior art, there is no way to track printed documents. Hard copy documents may be managed by scanning the documents into electronic form (soft copy) that is then managed by a document management system. In addition, management of native soft copies of documents (such as word processor files, spreadsheets, etc.) is easily done by a document management system. However, once a hard copy is printed from a soft copy, there are no known ways to manage the printed documents. One known attempt to manage printed documents is to print a footer on all word processing documents that shows the filename and storage location of the document. But this does not work for documents that are not word processing documents. In addition, while such a footer on a word processing document is eye-legible, it does not include any machine-readable information that allows the functions disclosed herein. The disclosure and claims herein improve on the prior art by providing a printed document manager that manages printed documents.

Figure 2:
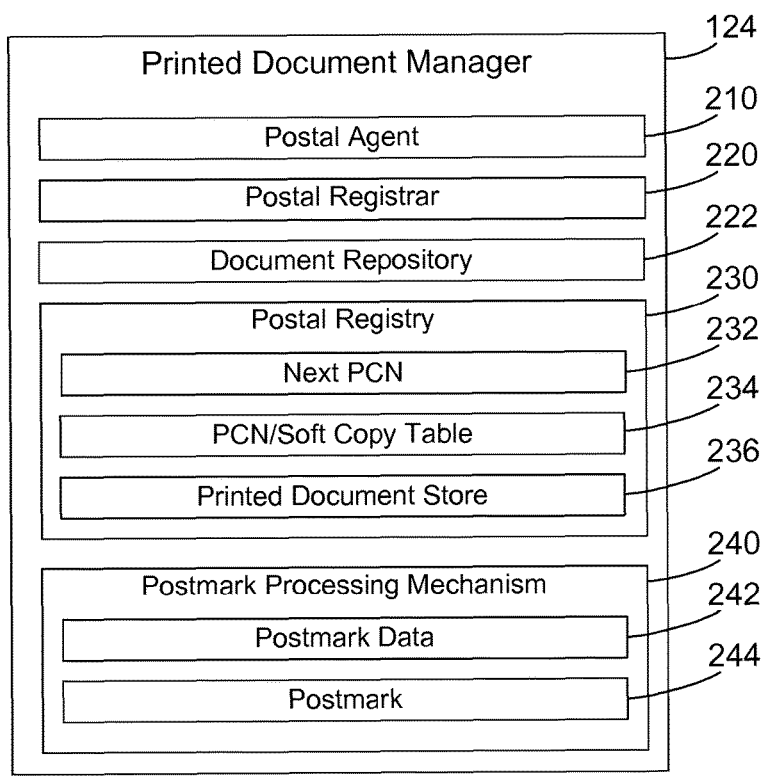
FIG. 2 is a block diagram showing possible components of the printed document manager shown in FIG. 1.

Some possible components of an embodiment of the printed document manager 124 in FIG. 1 are shown in FIG. 2. The printed document manager 124 may include a postal agent 210, a postal registrar 220, a document repository 222, a postal registry 230, and a postmark processing mechanism 240. The postal agent 210 can insert a postmark into the print stream for a printed document. In addition, the postal agent 210 registers printed documents with the postal registry 230 by sending information regarding the printed document to the postal registry 230. The postal registrar 220 assigns globally-unique postal certificate numbers (PCNs) to documents in the document management system. This can be done right after the document is created, when the document needs to be printed, or at some later time. In one specific implementation, the postal registrar 220 monitors a document repository 222, which represents one or more repositories (such as folders or directories) where new documents are stored in the document management system. When a new document is detected in the document repository 222, the postal registrar 220 assigns a PCN to the document, which effectively registers the document to be managed by the printed document manager 124. In one embodiment, the PCN is a unique number that identifies location of where the document is stored in the document management system.

The postal registry 230 stores information related to printed documents. The postal registry 230 preferably includes a next PCN 232, a PCN/Soft copy table 234, and a printed document store 236. The next PCN 232 is used by the postal registrar 220, which assigns PCNs to documents in the document repository 222. The correlation between PCNs and soft copies are stored in the PCN/soft copy table 234. The printed document store 236 is a database of printed documents. In one particular implementation, the printed document store 236 stores what is referred to herein as a "print pack" for a printed document that includes a metadata/image pair, where the metadata includes one or more attributes that describe the printed document, and the image is an image of the printed document.

Figures 15, 16, 17:
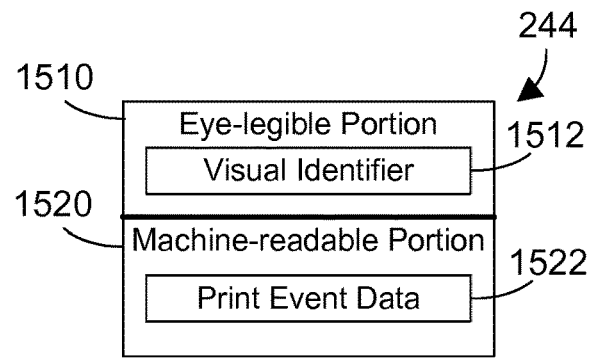
FIG. 15 is a diagram showing different portions that make up an embodiment of a postmark.
FIG. 16 is a diagram showing an embodiment of print event data for a postmark.
FIG. 17 is a diagram showing embodiments of data that could be included as metadata for a printed document.

The postmark processing mechanism 240 uses print event data to generate postmark data 242, from which a postmark 244 is generated. Postmark 244 is a graphical symbol printed on a printed document to help manage the printed document. The postmark 244 preferably includes an eye-legible portion and a machine-readable portion that is not eye-legible, as shown in FIG. 15. The machine-readable portion can be any suitable technology, whether currently known or developed in the future. Known technologies for the machine-readable portion include linear bar codes and square two-dimensional (2D) barcodes, which are known in the art. When a postmark 244 is printed on a printed document, several possible functions are possible with respect to the printed document, which are discussed in detail below.

While the various components of an embodiment of the printed document manager 124 are shown in FIG. 2, these can be distributed across any suitable number of computer systems in any suitable architecture or configuration, as needed. The disclosure and claims herein extend to any suitable configuration for a printed document manager that includes any or all of the components shown in FIG. 2 on one or more computer systems.

Figure 3:
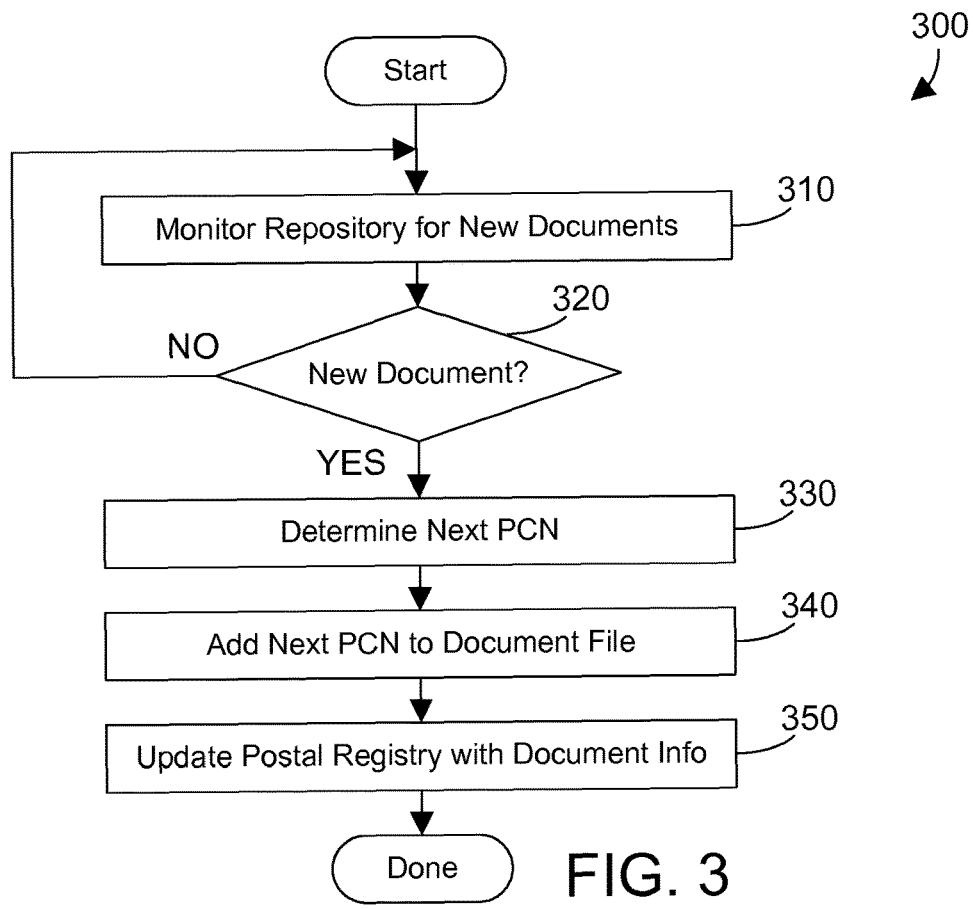
FIG. 3 is a flow diagram of a method adding a postal certificate number (PCN) to new documents in a document management system.

Referring to FIG. 3, a method 300 is preferably performed by the postal registrar 220 in FIG. 2, and represents one suitable way to register documents to be managed by the printed document manager 124. The postal registrar is responsible for assigning a globally-unique postal certificate number (PCN) to files in a document management system. In the implementation shown in FIG. 3, a repository is monitored for new documents (step 310). The repository could be, for example, a folder or directory where scanned documents are placed right after scanning. In the alternative, the repository could be a folder or directory where new native soft copy documents are stored after they are created in order to be managed by the document management system (such as DMS 123 in FIG. 1). When there are no new documents (step 320=NO), method 300 loops back to step 310 and continues. When there are one or more new documents in the repository (step 320=YES), a next PCN is determined (step 330), and the next PCN is added to the document file (step 340). The next PCN can be determined by the postal registrar 220 querying the postal registry 230, which then returns the next PCN 232. The PCN is preferably added to metadata in the document file so the PCN is not visible in the document itself. The PCN/Soft copy table 234 in postal registry 230 in FIG. 2 is then updated with the document information (step 350) so the printed document manager knows the correspondence between PCNs and soft copy documents. Method 300 is then done.

Figure 4:
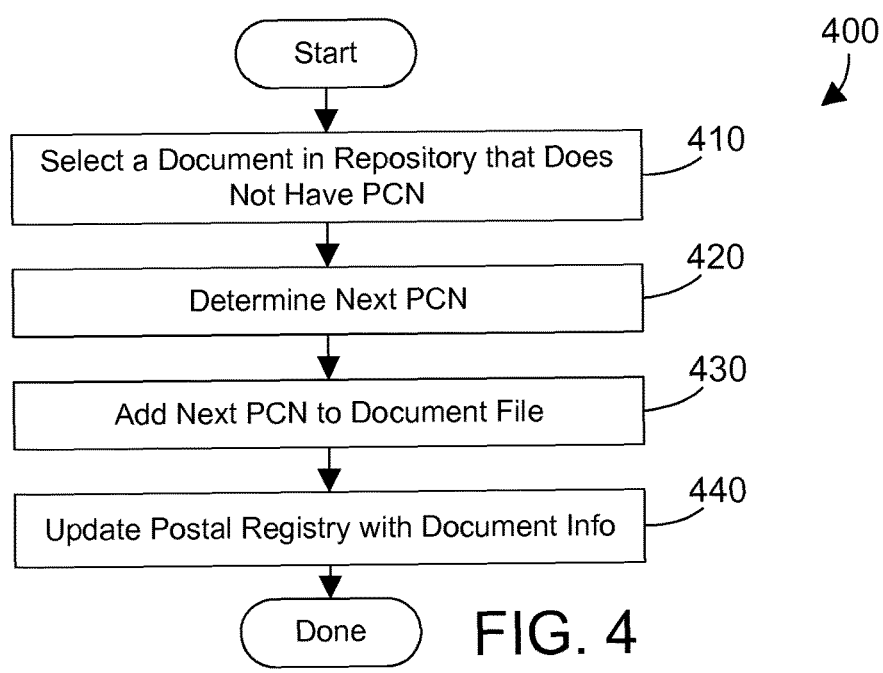
FIG. 4 is a flow diagram of a method for adding a PCN to documents in a DMS repository that do not have a PCN.

An alternative method for the postal registrar to register documents to be managed by the printed document manager 124 is shown in method 400 in FIG. 4. While method 300 in FIG. 3 is well-suited to monitoring a repository for new documents, method 400 in FIG. 4 is well-suited to processing a repository that may include many documents that have not been assigned a PCN. This would be the case, for example, when the printed document manager is installed for use in conjunction with an existing document management system (DMS). In this case, all the documents managed by the DMS could be gradually and systematically processed using method 400 in FIG. 4 to effectively register those soft copy documents to be managed by the printed document manager 124. Referring to FIG. 4, a document in the repository that does not have a PCN is selected (step 410). The next PCN is determined (step 420). In one suitable implementation, the postal registrar 220 queries the postal registry 230 to determine the next PCN 232. The next PCN is added to the document as a file attribute (step 430). The PCN/Soft copy table 234 in postal registry 230 in FIG. 2 is then updated with the document information (step 440) so the printed document manager knows the correspondence between PCNs and soft copy documents. Method 400 is then done.

In one suitable embodiment, the printed document manager 124 is used in conjunction with a document management system. Thus, step 310 in FIG. 3 monitors a repository in the document management system for new documents, and step 410 in FIG. 4 selects a document that does not have a PCN in a repository in the document management system. However, an alternative embodiment does not require a document management system. For example, the printed document manager could be used with a Windows-based system by simply designating a folder on a computer system or network as the "repository" where documents are stored. This and other variations are within the scope of the disclosure and claims herein.

Figure 5:
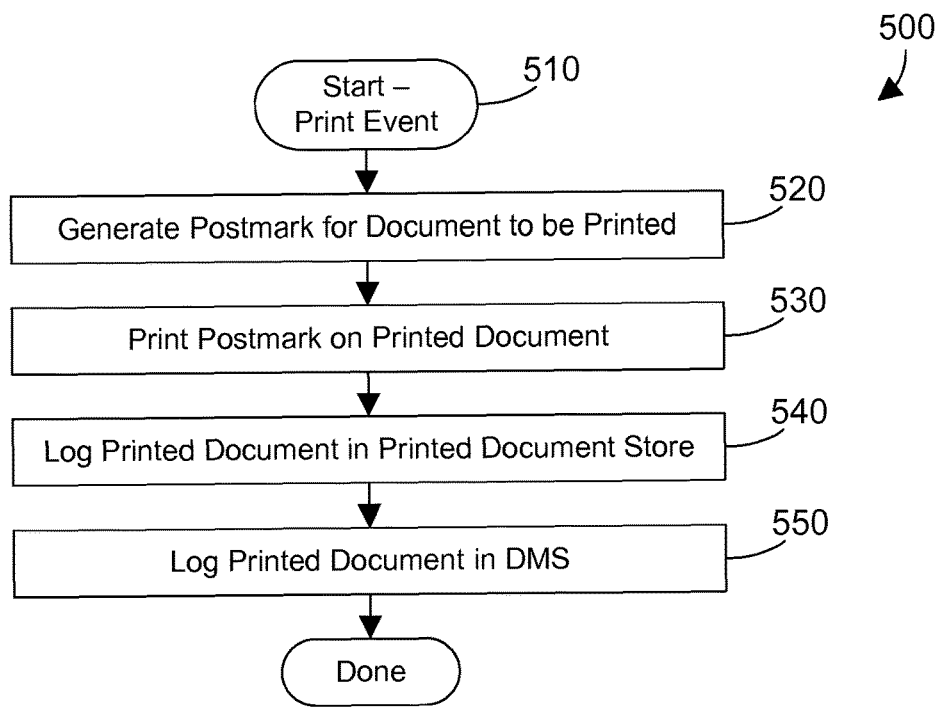
FIG. 5 is a flow diagram of a method for printing a postmark on a printed document and logging the printed document.

The postal agent 210 in FIG. 2 monitors print events and determines when to add a postmark to the printed document. Method 500 in FIG. 5 is preferably performed by the postal agent 210. Method 500 begins 510 when a print event is detected by the postal agent 210 (step 510). A print event can be detected by the postal agent 210 monitoring all print activity, such as anything printed on a computer system the postal agent 210 is running on, such as a user's workstation. A postmark is generated for the document to be printed (step 520). The postmark is a graphical symbol as discussed in more detail herein. The postmark is preferably generated from print event data that describes one or more attributes of the printed document. The postmark is printed on the printed document (step 530). This is preferably done by inserting print language instructions to print the postmark with the document using the standard print driver for the selected printer. In the most preferred implementation, the postmark is printed at a preferred location, such as the top right corner of the document, unless something in the printed document would interfere with the placement of the postmark at that location. In that case, the postmark could be printed in an alternative location. The alternative location could be a second specified location on the printed page, or could be dynamically determined by processing the soft copy to determine where the postmark can be placed without interfering with the printing on the printed document. In one implementation, the postmark could be printed on each page of a multi-page printed document. In the most preferred implementation, the postmark is printed only on the first page of a multi-page document. When a document does not have sufficient space for printing the postmark, a cover sheet can be printed that includes the postmark. In the alternative, the postmark could be printed on the back side of the page. The printed document is logged in the printed document store (step 540). This can be done, for example, by sending a print pack comprising a metadata/image pair to the postal registry 230, which stores the print pack in the printed document store 236. The printed document optionally may also be logged in the document management system (step 550) so the DMS can manage the soft copies of printed documents in addition to managing other soft copy documents. Method 500 is then done.

Note that in addition to printing a postmark on a printed document as shown in FIG. 5, the postal agent 210 could also display a postmark in a "print preview" of a document. This would provide an easy way for a user to determine whether a document has been registered with the printed document manager. Thus, if a user is not sure a document has been registered with the printed document manager (i.e., if the user is not sure a postmark will be printed on the document), the user could invoke a "print preview" function and visually verify the postmark is present. The steps in FIG. 5 can be applied to this "print preview" scenario when a "print preview" is deemed to be a print event in step 510. The postmark for the document to be previewed will be generated in step 520, and will be displayed in the print preview of the document in step 530. Steps 540 and 550 would preferably not be performed for this "print preview" scenario.

Figure 6:
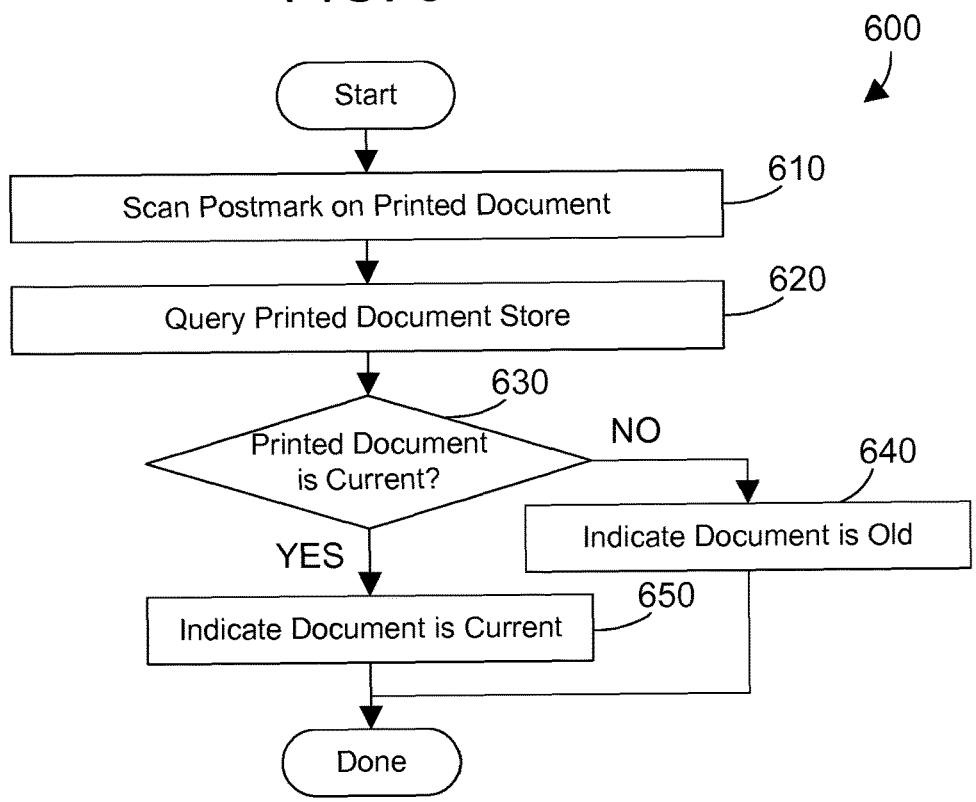
FIG. 6 is a flow diagram of a method for using a postmark on a printed document to determine whether the printed document is current.

Having a postmark printed on a printed document provides functionality that is lacking in the prior art. One function that can be performed is determining whether a printed document is current or not, as shown in method 600 in FIG. 6. The postmark on a printed document may be scanned (step 610), for example, with a suitable bar code reader. The printed document store is queried (step 620) to determine whether the printed document was printed from the current version of the document or from an old version of the document. When the printed document is current (step 630=YES), meaning the printed document corresponds to the current soft copy document, an indication is sent that the document is current (step 650). When the printed document is not current (step 630=NO), meaning the printed document does not correspond to the current soft copy document, an indication is sent that the document is old (step 640). Method 600 is then done. Method 600 can be useful to make sure hard copies are of the latest version of a document. For example, let's assume an attorney has a closing scheduled, and prints 15 copies of documents that must be signed. Let's further assume the closing is delayed until two weeks later. The attorney or secretary can easily determine whether the stack of hard copies that were previously printed for signatures are current or not by scanning the postmark on one of the copies. The printed document manager will then indicate whether the printed document is the current version or not.

Figure 7:
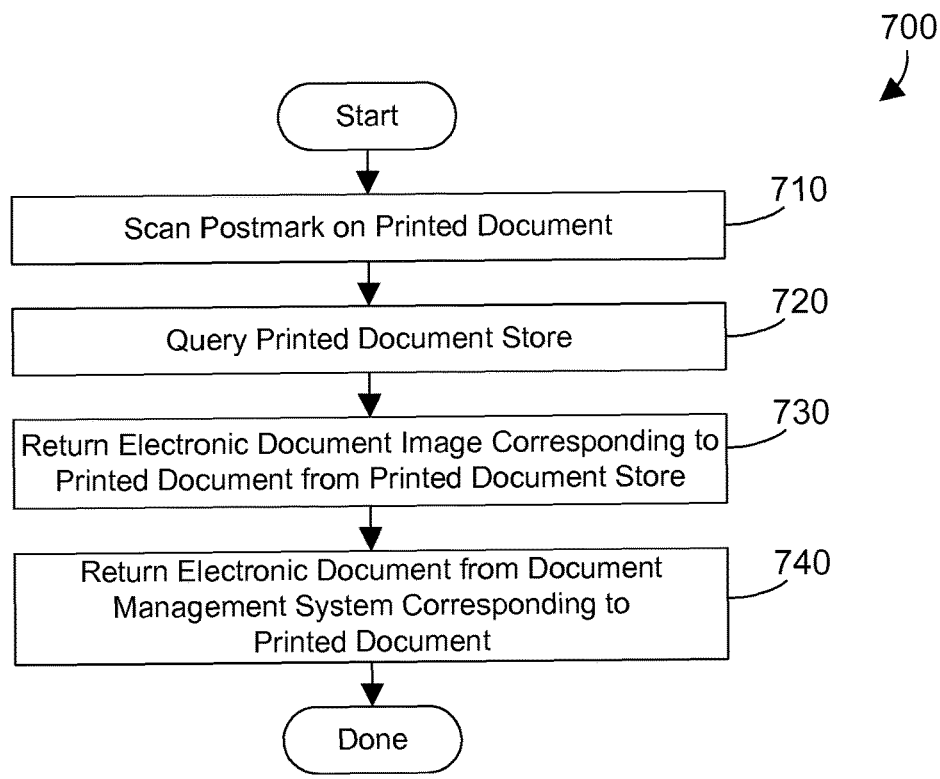
FIG. 7 is a flow diagram of a method for reading the postmark on a printed document and returning an electronic version of the printed document.

Another function that can be performed as a result of having a postmark printed on a hard copy document is to retrieve a soft copy of the printed document image or a soft copy of the document from which the printed copy was originally printed. Referring to FIG. 7, method 700 begins by scanning a postmark on a printed document (step 710). The printed document store is queried (step 720). Note that either or both of steps 730 and 740 can then be performed. In step 730, the electronic document image in the printed document store corresponding to the printed document is returned from the printed document store. In step 740, the electronic document in the document management system corresponding to the printed document is returned from the document management system. Method 700 thus provides a way to return an electronic image of the printed document from the printed document store (step 730), to return the soft copy of the original file from the document management system (step 740), or both.

Figure 8:
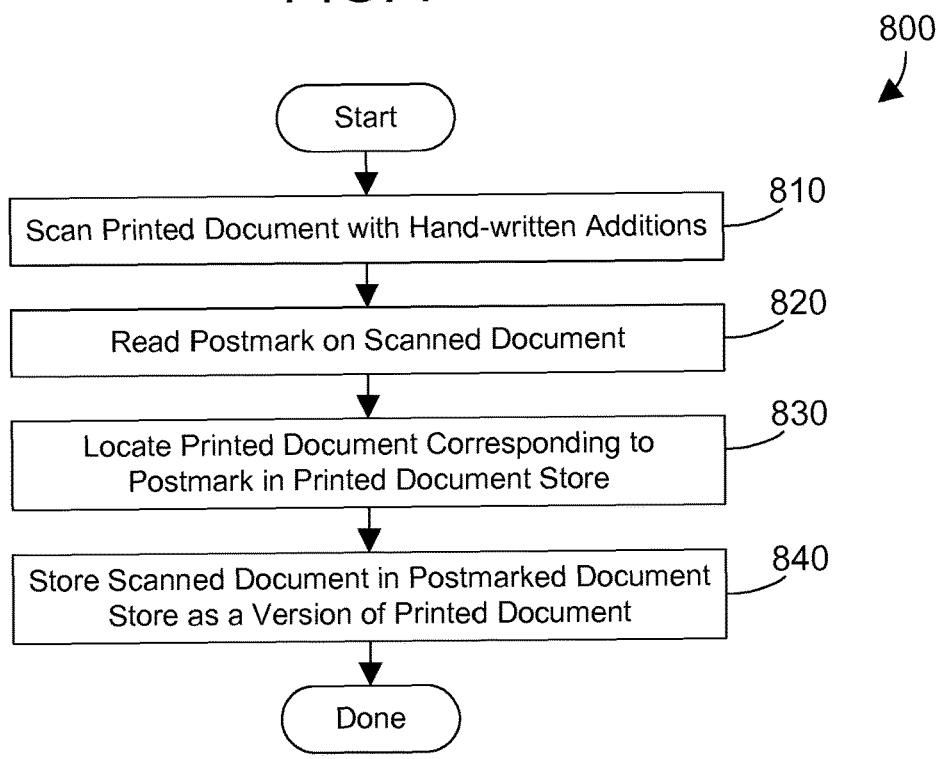
FIG. 8 is a flow diagram of a method for storing a hard copy that has hand-written annotations as an electronic version of the printed document.

Another function that can be performed as a result of having a postmark printed on a hard copy document is the storing of hand-written additions to a printed document as a version of the document. Referring to FIG. 8, method 800 begins by scanning a printed document that has hand-written additions (step 810). Many people hand-write notes, diagrams, and add other material right on the printed document. When the person wants his or her hand-written additions to be saved in the document management system, the person can place the hard copy with the hand-written additions in a scan bin so the document is scanned for entry into the DMS. The scanning of the document is done in step 810. The postmark on the scanned document is read (step 820). The printed document corresponding to the postmark is located in the printed document store (step 830). The scanned document is then stored as a hand-notated version of the printed document (step 840). Method 800 is then done. The printed document manager thus has the capability of managing different versions of the same document, with a scanned document that includes hand-written additions being added as a version of the document.

Figure 9:
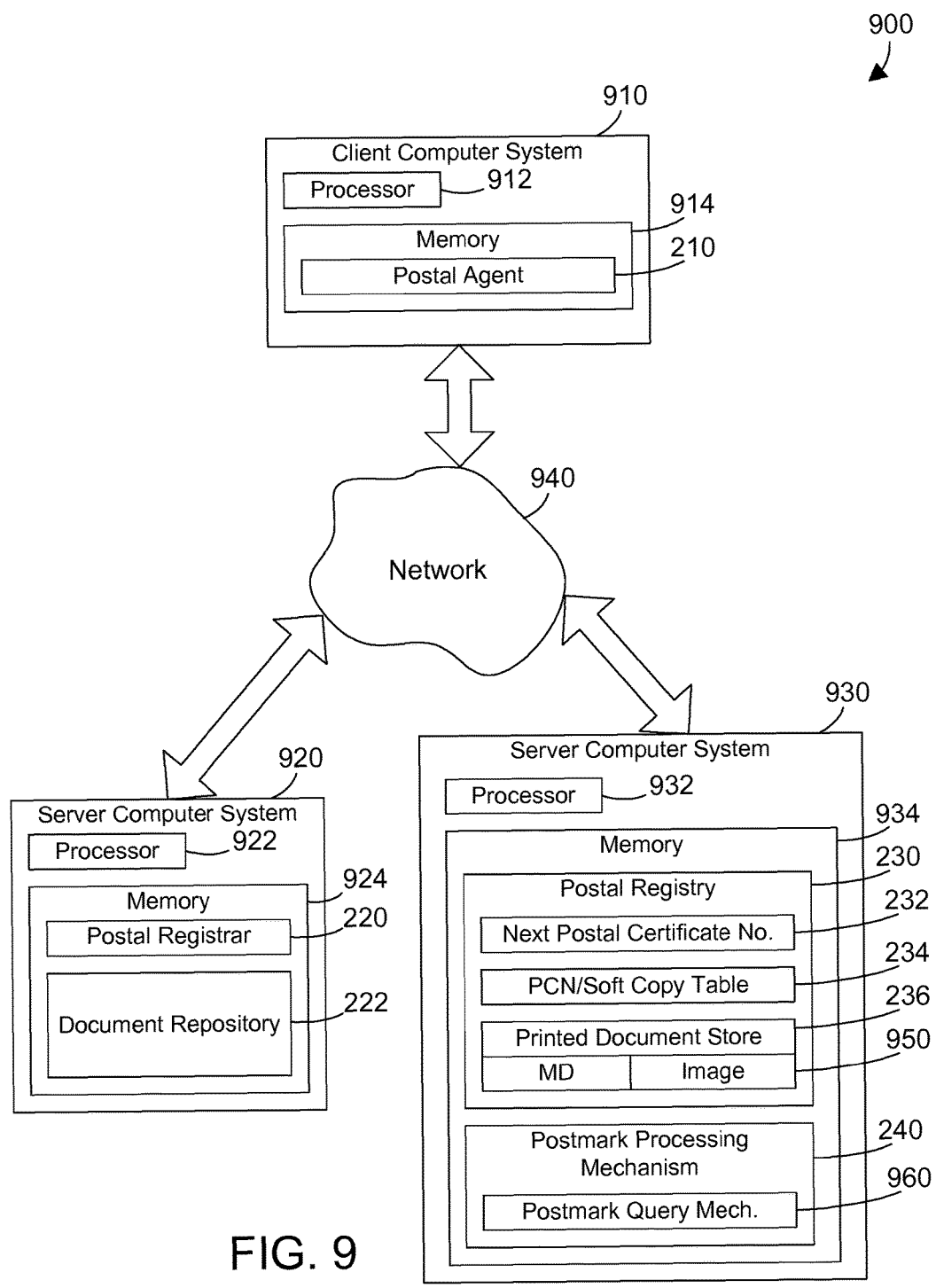
FIG. 9 is a block diagram showing one suitable implementation for the components in the printed document manager shown in FIG. 2 on different computer systems.

As stated above, the embodiment of the printed document manager 124 shown in FIG. 2 can include multiple components that can be implemented on multiple computer systems. FIG. 9 shows one suitable configuration for many of the components shown in FIG. 2 in a networked computer system 900. A client computer system 910 is coupled to two server computer systems 920 and 930 via a network 940. The client computer system 910 includes one or more processors 912 and a memory 914 that includes the postal agent 210 that is executed by the one or more processors 912. Postal agent 210 can perform functions such as method 500 in FIG. 5. The server computer system 920 includes one or more processors 922 and a memory 924 that includes the postal registrar 220 that is executed by the one or more processors 922, and one or more document repositories 222.

The postal registrar 220 can perform functions such as methods 300 and 400 in FIGS. 3 and 4, respectively. The server computer system 930 includes one or more processors 932 and a memory 934 that includes the postal registry 230 and the postmark processing mechanism 240 executed by the one or more processors 932. The postal registry 230 preferably includes the next postal certificate number 232, the PCN/Soft copy table 234 and the printed document store 236. The printed document store 236 comprises entries that each includes a metadata/image pair 950, where the metadata includes one or more attributes that describe the printed document, and the image is an image of the printed document. The postmark processing mechanism 240 includes a postmark query mechanism 960 that receives a scanned postmark and performs various functions with respect to the scanned postmark, such as methods 600, 700 and 800 shown in FIGS. 6, 7 and 8, respectively.

Figures 10, 11:
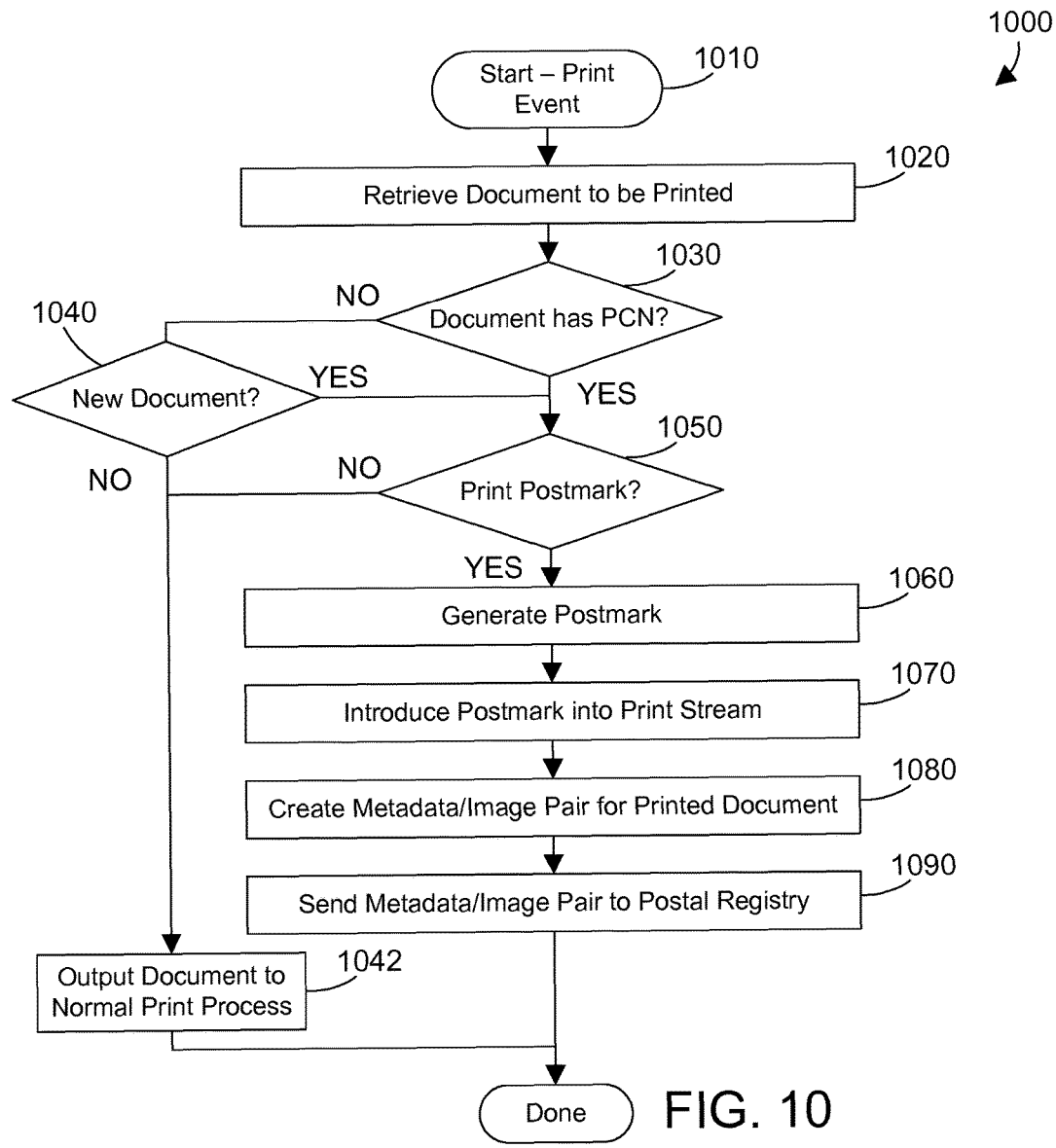
FIG. 10 is a flow diagram of a method for printing documents.
FIG. 11 is a block diagram showing one suitable embodiment of a postal certificate number (PCN)

While FIG. 5 shows a method 500 that may be performed by the postal agent 210 to print a postmark on a printed document, there may be some instances where a postmark will not be printed on a printed document. FIG. 10 shows a more detailed method 1000 for the postal agent 210 to account for some circumstances where printing the postmark is not possible or desirable. Method 1000 begins with the initiation of a print event (step 1010). The document to be printed is retrieved (step 1020). When the document does not have a PCN (step 1030) and the document is not a newly-created document (step 1040=NO), the document is output to the normal print process (step 1042). The result is the document is printed without a postmark. The document is only printed with a postmark if the document includes a PCN, which effectively registers the document with the printed document manager. Documents not registered with the printed document manager (i.e., that don't have a PCN) are not printed with postmarks.

If the document does not have a PCN (step 1030=NO) because the document is a new document (step 1040=YES) the user is prompted regarding whether the document should be printed with a postmark or not (step 1050). If the user decides to print the document without a postmark (step 1050=NO), the document is output to the normal print process (step 1042), which results in the document being printed without a postmark. If the user decided to print the document with a postmark (step 1050=YES), a postmark is generated (step 1060) and introduced into the print stream for the document (step 1070), which results in the postmark being printed on the printed document. A print pack comprising a metadata/image pair for the scanned document is created (step 1080) and sent to the postal registry (step 1090), which results in storing the metadata/image pair 950 in the printed document store. In the case where the document does not have a PCN (step 1030=NO), the document is a new document (step 1040=YES) and the user selects to print a postmark on the printed document (step 1050=YES), step 1060 will necessarily require assigning a PCN to the new document in order to generate the postmark.

A postal certificate number (PCN) can include any suitable data that creates a globally unique identifier for a printed document. A PCN can be considered a serial number for a document that effectively registers the document to be managed by the printed document manager 124. In a computer system running a Microsoft Windows operating system, the PCN is added to the document's file as a Windows file system extended attribute so the PCN stays with the file when the file is copied or attached to an e-mail message. In one suitable implementation, a PCN is a string of characters containing no meaningful words or initials that could be used outside of the system to identify the document. In addition to being stored in the actual data file, the PCN is also written to the postal registry 230 in the PCN/Soft copy table 234. A sample PCN 1110 is shown in FIG. 11 to include a firm identifier, a repository identifier, and a document identifier. In this specific example shown in FIG. 11, the firm identifier comprises three characters, and repository identifier comprises two characters, and the document identifier comprises seven characters, which makes the PCN twelve characters total. In this specific implementation, the firm identifier AEL is a text code that identifies the firm, and becomes an eye-legible portion of all postmarks for the firm. The repository identifier can designate a repository where the soft copy of the document is stored. The combination of the repository identifier and the document identifier provides enough information to locate the soft copy of the document corresponding to the PCN in a document repository.

Figure 12:
FIG. 12 is a diagram showing a suitable embodiment of a printed document that includes a postmark.

Referring to FIG. 12, a sample printed document 1210 is an invoice for a law firm, and includes a printed postmark 244. Note the printed postmark 244 includes the three letter firm identifier AEL in the PCN shown in FIG. 11 as the eye-legible portion of the postmark, along with a two-dimensional square barcode that encodes data used to generate the postmark that is not eye-legible. In the sample printed document 1210 shown in FIG. 12, the postmark 244 is placed in the upper right corner of the document. However, as discussed above, the postmark may be printed on any suitable location on the printed document and can even be printed on a cover sheet or on the back side of the printed document.

Figure 13:
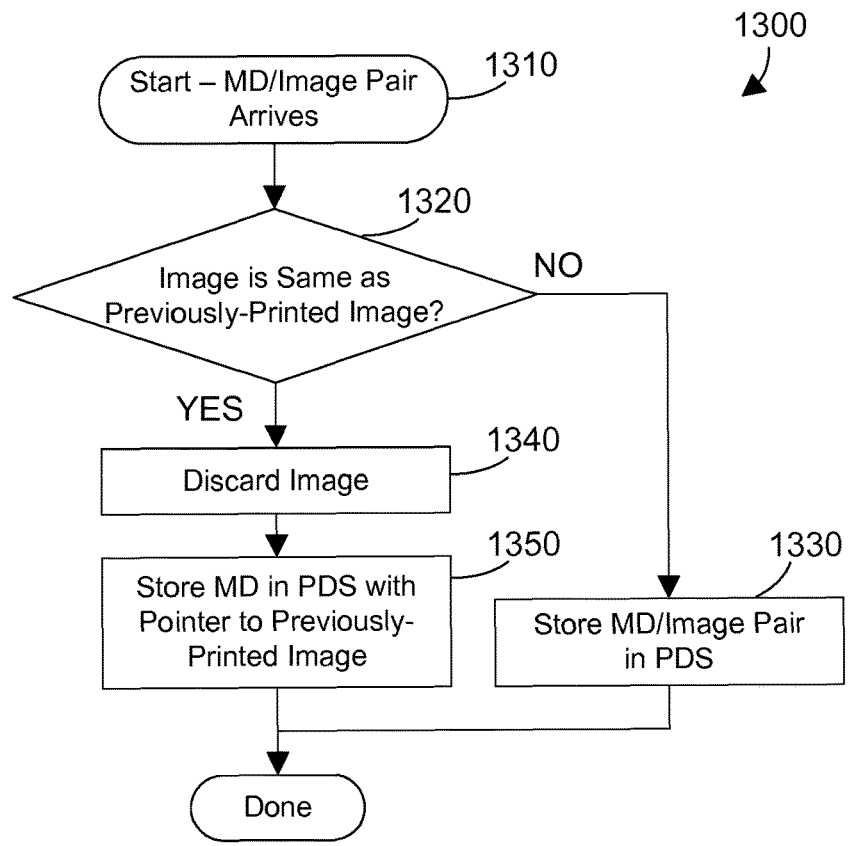
FIG. 13 is a flow diagram of a method for storing a printed document in the printed document store.

Some documents may be printed repeatedly at different times. The printed document manager thus preferably includes a mechanism for detecting when a document that has been printed is the same as a document that was previously printed. When a postal agent prints a printed document with a postmark, the print pack comprising the metadata/image pair is sent to the postal registry. Referring to FIG. 13, method 1300 begins when the metadata/image pair arrives at the postal registry 232 (step 1310). When the image is not the same as a previous-printed image (step 1320=NO), the metadata/image pair is stored in the printed document store (step 1330). When the image is the same as a previous-printed image (step 1320=YES), the image portion of the metadata/image pair is discarded (step 1340) and the metadata portion of the metadata/image pair is stored in the printed document store with a pointer to the previously-printed image (step 1350). One suitable way to determine whether the image is the same is to compare a checksum for the image to checksums for images stored in the printed document store. In this manner the printed document store still tracks each print event without having to store multiple copies of the same image for different print events.

Figure 14:
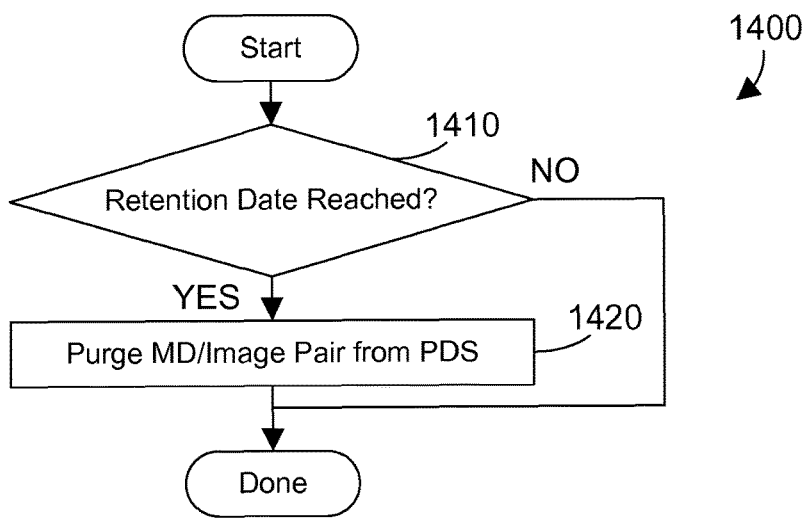
FIG. 14 is a flow diagram of a method for purging data corresponding to a printed document from the printed document store.

The postal registry 230 may include a mechanism to automatically purge printed documents from the printed document store. This could be based, for example, on a retention date specified for a document. Referring to FIG. 14, as long as the retention date is not reached (step 1410=NO), method 1400 takes no action. When the retention date is reached (step 1410=YES), the metadata/image pair is purged from the printed document store (step 1420). Note the retention date can refer to a retention date for a particular printed document stored in the printed document store, or can refer to a retention date of a soft copy document in a document management system (DMS). Method 1400 thus provides an interface for the printed document manager to work in conjunction with a DMS so that when documents are purged from a DMS, the printed copies of those documents are also purged from the printed document store.

FIG. 15 shows that an embodiment of postmark 244 preferably includes an eye-legible portion 1510 and a machine-readable portion 1520 that is not eye-legible. The eye-legible portion 1510 includes a visual identifier 1512, such as the letters AEL shown in postmark 244 in FIG. 12. The machine-readable portion 1520 includes print event data 1522 that describes the print event. Note that postmark 244 is generated from postmark data 242 in FIG. 2, which preferably includes both the visual identifier 1512 and the print event data 1522. One suitable example of print event data 1522 is shown in FIG. 16 to include a date/time field and a machine field. The data/time field indicates year/date/hour/minute/second when the printed document was printed, while the machine field indicates which printer printed the printed document. Because it is impossible for multiple documents to be printed on the same printer at the same instant in time, the print event data 1522 shown in FIG. 16 makes the postmark 244 shown in FIG. 15 globally unique. In one specific implementation, the print event data 1522 is encoded so the data in the postmark would be indecipherable by other systems.

In one exemplary embodiment, text could be printed with the postmark. For example, a law firm may want to print "Attorney-client Privileged" on each page of certain printed documents, or other text such as "Subject to XX Protective Order" or "Attorney Eyes Only." The disclosure and claims herein extend to printing any suitable text or information with a postmark on a printed document.

As discussed in detail above, a print pack includes a metadata/image pair, where the metadata includes at least one attribute that describes the printed document and the image is an image of the printed document. One suitable example of metadata that could be included in a metadata/image pair is a file in eXtensible Markup Language (XML). One suitable implementation of an XML file that could be metadata in a metadata/image pair is shown in FIG. 17 to include postmark data, PCN, document name, user name, printing application, printer, number of copies, page count, date, time and MAC address. Of course, other attributes relating to the printed document could also be included in the metadata. The disclosure and claims herein expressly extend to any suitable metadata that could be stored in a metadata/image pair to describe some attribute related to the printed document.

Figure 18:
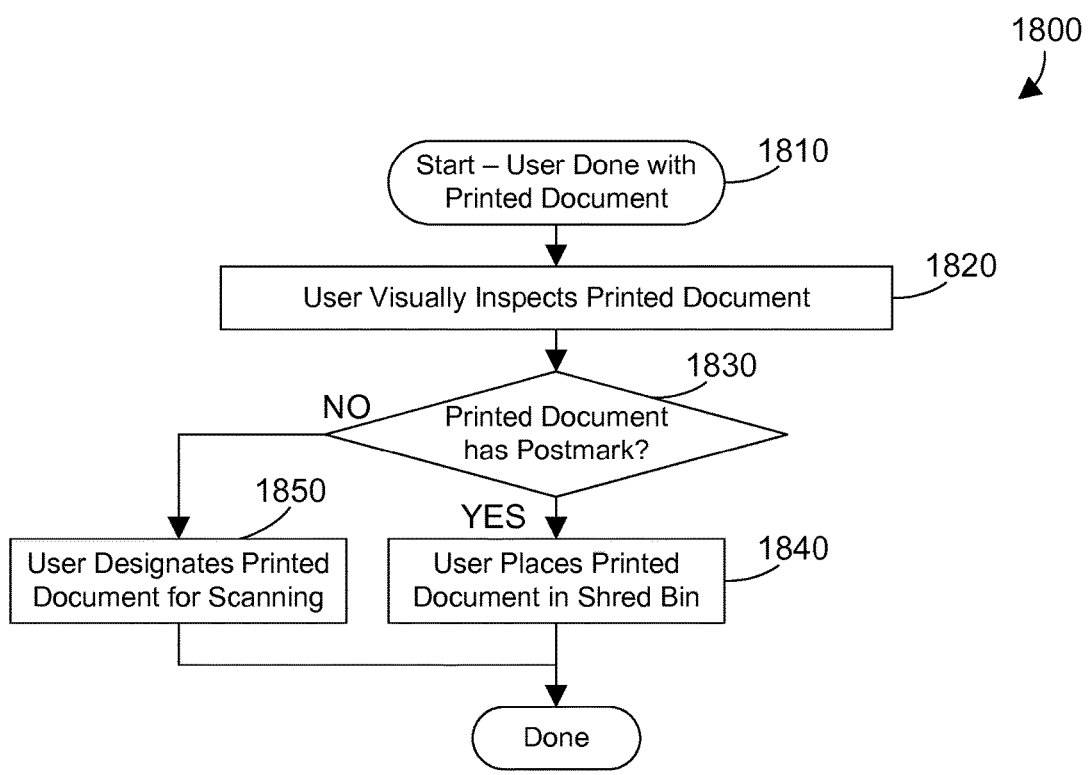
FIG. 18 is a flow diagram of a method for determining disposition of a printed document when a user has finished with the printed document.

One of the advantages of having a postmark printed on printed documents is the postmark provides a visual indication that the document was printed from a soft copy managed by the document management system (DMS). The postmark thus serves as a visual indication that the document may be discarded or shredded when it is no longer needed. Referring to FIG. 18, method 1800 begins when a user is done with a printed document (step 1810). The user visually inspects the printed document (step 1820). When the printed document has a postmark (step 1830=YES), the user knows the document is already stored in the DMS, so the user can discard the printed document by placing the printed document in a shred bin for disposal (step 1840). When the printed document does not have a postmark (step 1830), this is a visual indication to the user that the printed document may not yet have been stored in the DMS, so the user could designate the printed document for scanning (step 1850) so the document can be scanned and stored in the DMS. A user could designate the printed document for scanning in step 1850 by placing the document in a bin designated for documents to be scanned. While method 1800 seems simple, it is a very powerful tool to be able to visually determine based on a postmark that a printed document can be shredded instead of retained when the printed document is no longer needed. Without the ability to quickly determine whether a printed document should be shredded or not, many people that use known document management systems simply re-file the printed document, which incurs the corresponding labor, cost and additional paper in the file that is avoided using the printed document manager described herein.

The printed document manager could also provide additional functions. For example, the printed document manager could control the number of printed documents printed from a particular file in the document management system. Thus, if a company is involved in litigation, and is required to produce a specified number of printed copies, the printed document manager could keep track of who printed the document so the copy can be returned or destroyed before more copies are printed. In addition, the printed document manager could be used in a system that prints with magnetic ink to assure printed documents do not leave the premises. Of course, many other functions could be performed by the printed document manager disclosed herein.

The figures and specification discussed above support an apparatus comprising: at least one processor; a memory coupled to the at least one processor; a printed document manager residing in the memory and executed by the at least one processor, the printed document manager comprising: an agent mechanism that detects a print event for a soft copy document, and in response, generates a graphical postmark from data corresponding to the print event and inserts the graphical postmark into a print stream for the soft copy document so the graphical postmark is printed on a printed document corresponding to the soft copy document.

The figures and specification discussed above additionally support a networked computer system comprising: a first computer system comprising: a first processor; a first memory coupled to the first processor; an agent mechanism residing in the first memory and executed by the first processor, the agent mechanism detecting a print event on the first computer system for a soft copy document, and in response, the agent mechanism generates a graphical postmark from data corresponding to the print event and inserts the graphical postmark into a print stream for the soft copy document so the graphical postmark is printed on a printed document corresponding to the soft copy document, wherein the graphical postmark comprises an eye-legible portion and a machine-readable portion that is not eye-legible; a second computer system coupled via network connection to the first computer system, the second computer system comprising: a second processor; a second memory coupled to the second processor; a registrar mechanism residing in the second memory and executed by the second processor, the registrar mechanism monitoring a plurality of documents in a document repository and assigning a globally-unique certificate number to each of the plurality of documents in the document repository; a third computer system coupled via network connection to the first and second computer systems, the third computer system comprising: a third processor; a third memory coupled to the third processor; a registry mechanism residing in the third memory and executed by the third processor, the registry mechanism including a printed document store, wherein the agent mechanism registers the printed document with the registry mechanism by sending a metadata/image pair corresponding to the printed document to the registry mechanism, and in response to receiving the metadata/image pair corresponding to the printed document from the agent mechanism, the registry mechanism stores the metadata/image pair in a printed document store, wherein metadata in the metadata/image pair includes at least one attribute that describes the printed document and an image in the metadata/image pair is an image of the printed document; a postmark processing mechanism residing in the third memory and executed by the third processor, the postmark processing mechanism receiving a scanned postmark and, in response, identifying a printed document in the printed document store corresponding to the scanned postmark, and performing at least one: indicating whether the printed document corresponding to the scanned postmark is current; returning the printed document in the printed document store corresponding to the scanned postmark; and returning a soft copy document corresponding to the scanned postmark.

The figures and specification discussed above further support a computer-implemented method executed by at least one processor for managing printed documents, the method comprising: detecting a print event for a soft copy document; and in response to detecting the print event, generating a graphical postmark from data corresponding to the print event and inserting the graphical postmark into a print stream for the soft copy document so the graphical postmark is printed on a printed document corresponding to the soft copy document.

The figures and specification discussed above also support a computer-implemented method executed by at least one processor for managing printed documents, the method comprising: monitoring documents in a document repository; assigning a globally-unique certificate number to each of the plurality of documents; detecting a print event for a soft copy document; determining when the soft copy document includes a globally-unique certificate number; when the soft copy document includes the globally-unique certificate number: generating a graphical postmark from data corresponding to the print event and inserts the graphical postmark into a print stream for the soft copy document so the graphical postmark is printed on a printed document corresponding to the soft copy document, wherein the graphical postmark comprises an eye-legible portion and a machine-readable portion that is not eye-legible; registering the printed document with a registry mechanism by sending a metadata/image pair corresponding to the printed document to the registry mechanism, wherein metadata in the metadata/image pair includes at least one attribute that describes the printed document and an image in the metadata/image pair is an image of the printed document; storing the metadata/image pair in a printed document store; receiving a scanned postmark from a hard copy printed document; identifying a printed document in the printed document store corresponding to the scanned postmark; performing at least one of the following: indicating whether the printed document corresponding to the scanned postmark is current; returning the identified printed document in the printed document store corresponding to the scanned postmark; and returning a soft copy document corresponding to the scanned postmark.

A printed document manager manages printed documents. When a document is printed, a graphical symbol referred to as a "postmark" is generated and inserted into the print stream so the postmark is printed on the hard copy of the document. The printed document is then logged in a printed document store. The postmark on the printed document can be used to determine whether the printed document is current, to locate the corresponding print image in the printed document store, to locate the corresponding electronic document in the document management system, and to determine the printed document can be shredded. The printed document manager thus provides a way to effectively manage printed documents.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a document management system residing in the memory and executed by the at least one processor, the document management system managing soft copies of documents residing in a document repository;
   a printed document manager residing in the memory and executed by the at least one processor that is separate from the document management system, the printed document manager comprising:
   an agent mechanism that detects a print event for a soft copy document, and in response, determines whether the soft copy document is included in a registry that specifies documents in the repository of the document management system that are managed by the printed document manager, and when the soft copy document is included in the registry, the agent mechanism generates a graphical postmark from data corresponding to the print event and inserts the graphical postmark into a print stream for the soft copy document so the graphical postmark is printed on a printed document corresponding to the soft copy document, and when the soft copy document is not included in the registry, the agent mechanism does not generate or insert any graphical postmark into the print stream for the soft copy document; and
   a registry mechanism that includes the registry and a printed document store, wherein when the printed document corresponding to the soft copy document includes the graphical postmark, the agent mechanism registers the printed document with the registry mechanism by sending a metadata/image pair corresponding to the printed document to the registry mechanism, wherein an image in the metadata/image pair is an image of the printed document, and the printed document store contains only printed documents and does not contain any soft copy versions of the printed document that have not been printed.

2. The apparatus of claim 1 wherein the printed document manager comprises a registrar mechanism that monitors a plurality of documents in the document repository of the document management system and registers the plurality of the documents in the document repository of the document management system with the printed document manager, which enables the printed document manager to perform at least one function when the soft copy document is printed.

3. The apparatus of claim 2 wherein the registrar mechanism registers the plurality of documents in the document repository of the document management system with the printed document manager by creating an entry in the registry for each of the plurality of documents in the repository of the document management system.

4. The apparatus of claim 1 wherein, in response to receiving the metadata/image pair corresponding to the printed document from the agent mechanism, the registry mechanism stores the metadata/image pair in the printed document store.

5. The apparatus of claim 4 wherein the printed document manager further comprises a postmark processing mechanism that receives a scanned postmark and, in response, identifies a printed document in the printed document store corresponding to the scanned postmark.

6. The apparatus of claim 5 wherein the postmark processing mechanism indicates whether the printed document corresponding to the scanned postmark is current.

7. The apparatus of claim 5 wherein the postmark processing mechanism returns the identified printed document in the printed document store corresponding to the scanned postmark.

8. The apparatus of claim 5 wherein the postmark processing mechanism returns a soft copy document corresponding to the scanned postmark from the document repository of the document management system.

9. The apparatus of claim 1 wherein metadata in the metadata/image pair includes at least one attribute that describes the printed document.

10. The apparatus of claim 1 wherein the graphical postmark comprises an eye-legible portion and a machine-readable portion that is not eye-legible.

11. A networked computer system comprising:
    a first computer system comprising:
       a first processor;
       a first memory coupled to the first processor;
       an agent mechanism residing in the first memory and executed by the first processor, the agent mechanism detecting a print event on the first computer system for a soft copy document, and in response, the agent mechanism determines whether the soft copy document is included in a registry that specifies documents in the repository of the document management system that are registered to be managed by a printed document manager, and when the soft copy document is included in the registry, the agent mechanism generates a graphical postmark from data corresponding to the print event and inserts the graphical postmark into a print stream for the soft copy document so the graphical postmark is printed on a printed document corresponding to the soft copy document, and when the soft copy document is not included in the registry, the agent mechanism does not generate or insert any graphical postmark into the print stream for the soft copy document, wherein the graphical postmark comprises an eye-legible portion and a machine-readable portion that is not eye-legible;
    a second computer system coupled via network connection to the first computer system, the second computer system comprising:
       a second processor;
       a second memory coupled to the second processor;
       a registrar mechanism residing in the second memory and executed by the second processor, the registrar mechanism monitoring a plurality of documents in a document repository of a document management system and registering the plurality of documents with a registry mechanism by creating an entry in the registry for each of the plurality of documents in the repository of the document management system;
    a third computer system coupled via network connection to the first and second computer systems, the third computer system comprising:

a third processor;

a third memory coupled to the third processor;

the registry mechanism residing in the third memory and executed by the third processor, the registry mechanism including a printed document store, wherein the agent mechanism registers the printed document with the registry mechanism by sending a metadata/image pair corresponding to the printed document to the registry mechanism, and in response to receiving the metadata/image pair corresponding to the printed document from the agent mechanism, the registry mechanism stores the metadata/image pair in the printed document store, wherein metadata in the metadata/image pair includes at least one attribute that describes the printed document and an image in the metadata/image pair is an image of the printed document, wherein the printed document store contains only printed documents and does not contain any soft copy versions of the printed document that have not been printed;

a postmark processing mechanism residing in the third memory and executed by the third processor, the postmark processing mechanism receiving a scanned postmark and, in response, identifying a printed document in the printed document store corresponding to the scanned postmark, and performing at least one:

indicating whether the printed document corresponding to the scanned postmark is current;

returning the printed document in the printed document store corresponding to the scanned postmark; and returning a soft copy document corresponding to the scanned postmark from the document repository of the document management system.

12. A computer-implemented method executed by at least one processor for managing printed documents, the method comprising:

detecting a print event for a soft copy document stored in a document repository of a document management system;

in response to detecting the print event, determining whether the soft copy document is included in a registry that specifies documents in the repository of the document management system that are registered to be managed by a printed document manager;

when the soft copy document is included in the registry, generating a graphical postmark from data corresponding to the print event and inserting the graphical postmark into a print stream for the soft copy document so the graphical postmark is printed on a printed document corresponding to the soft copy document;

when the soft copy document is not included in the registry, not generating or inserting any graphical postmark into the print stream for the soft copy document;

when the printed document corresponding to the soft copy document includes the graphical postmark, registering the printed document with a registry mechanism by sending a metadata/image pair corresponding to the printed document to the registry mechanism, wherein an image in the metadata/image pair is an image of the printed document; and the registry mechanism storing the metadata/image pair in a printed document store that contains only printed documents and does not contain any soft copy versions of the printed document that have not been printed.

13. The method of claim 12 further comprising:
monitoring a plurality of documents in the document repository of the document management system; and creating an entry in the registry for each of the plurality of documents in the repository of the document management system.

14. The method of claim 12 further comprising:
receiving a scanned postmark from a hard copy printed document; and
identifying a printed document in the printed document store corresponding to the scanned postmark.

15. The method of claim 14 further comprising:
indicating whether the printed document corresponding to the scanned postmark is current.

16. The method of claim 14 further comprising:
returning the identified printed document in the printed document store corresponding to the scanned postmark.

17. The method of claim 14 further comprising:
returning a soft copy document corresponding to the scanned postmark from the document repository of the document management system.

18. The method of claim 12 wherein metadata in the metadata/image pair includes at least one attribute that describes the printed document.

19. The method of claim 12 wherein the graphical postmark comprises an eye-legible portion and a machine-readable portion that is not eye-legible.

20. A computer-implemented method executed by at least one processor for managing printed documents, the method comprising:

monitoring documents in a document repository of a document management system;

registering a plurality of the documents in the document repository of the document management system with a registry mechanism;

detecting a print event for a soft copy document in the document repository of the document management system;

determining whether the soft copy document is registered with the registry mechanism;

when the soft copy document is registered with the registry mechanism:

generating a graphical postmark from data corresponding to the print event and inserting the graphical postmark into a print stream for the soft copy document so the graphical postmark is printed on a printed document corresponding to the soft copy document, wherein the graphical postmark comprises an eye-legible portion and a machine-readable portion that is not eye-legible;

registering the printed document with the registry mechanism by sending a metadata/image pair corresponding to the printed document to the registry mechanism, wherein metadata in the metadata/image pair includes at least one attribute that describes the printed document and an image in the metadata/image pair is an image of the printed document, the registry mechanism comprising a registry that correlates each document in the printed document store to a corresponding soft copy document in the repository of the document management system;

storing the metadata/image pair in a printed document store that contains only printed documents and does not contain any soft copy versions of the printed document that have not been printed;

when the soft copy document is not registered with the registry mechanism:

not generating or inserting any graphical postmark into the print stream for the soft copy document;

receiving a scanned postmark from a hard copy printed document;
identifying a printed document in the printed document store corresponding to the scanned postmark;
performing at least one of the following:
   indicating whether the printed document corresponding to the scanned postmark is current;
   returning the identified printed document in the printed document store corresponding to the scanned postmark; and
   returning a soft copy document corresponding to the scanned postmark from the document repository of the document management system.

\* \* \* \* \*